United States Patent [19]

Hirao et al.

[11] 3,757,886
[45] Sept. 11, 1973

[54] POWER STEERING MECHANISM FOR VEHICLES

[75] Inventors: Osamu Hirao, Tokyo; Youichi Kimoto, Nagoya; Toyoshi Sakano, Aichi, all of Japan

[73] Assignee: Mitsubishi Jidosha Kogyo Kabushiki Kaisha, Tokyo, Japan

[22] Filed: July 6, 1971

[21] Appl. No.: 159,885

[30] Foreign Application Priority Data
July 10, 1970 Japan.................................. 45/59838

[52] U.S. Cl.................................. 180/79.2 R, 91/6
[51] Int. Cl.................................................. B62d 5/06
[58] Field of Search.................. 180/79.2 R; 60/52 S; 91/6

[56] References Cited
UNITED STATES PATENTS
3,564,848  2/1971  Baatrup et al. ................. 180/79.2 R
3,491,846  1/1970  Ohtsuka et al. ................. 180/79.2 R Primary Examiner—Leo Friaglia
Assistant Examiner—John A. Pekar
Attorney—Bosworth, Sessions, Herrstrom & Cain

[57] ABSTRACT

A system including a pump and a control valve is added to a conventional power steering mechanism for a vehicle so as to advance the operating phase of the steering mechanism. The pump is driven by the steering shaft and discharges a fixed quantity of hydraulic fluid as the steering shaft is successively rotated from an angular position of rotation to another through a predetermined angle. The fluid under pressure is supplied to the control valve to derive an output proportional to the angular velocity of rotation of the steering shaft, and this output is applied to an actuator together with the output derived from an existing control valve so as to steer the road engaging wheels without any phase lag.

8 Claims, 12 Drawing Figures

PATENTED SEP 11 1973  3,757,886

HANDLE ANGLE ———————— θ
ACTUAL STEERING ANGLE — α
ATTITUDE ANGLE ————— ψ
LATERAL DISPLACEMENT — y

PHASE ANGLE

POWER STEERING MECHANISM FOR VEHICLES

This invention relates to a power steering mechanism for automotive vehicles and more particularly to a system for advancing the operating phase of such a power steering mechanism.

In an automotive vehicle equipped with conventional power steering apparatus, the response of the steering system and the body of the vehicle takes place with a certain time lag relative to the steering action by the driver. In other words, the attitude angle of the body of a vehicle equipped with a conventional steering apparatus lags behind the handle angle generally by more than 90° in phase and the lateral displacement of the vehicle body takes place generally with a phase lag of more than 180° relative to the handle angle when the driver started to steer the vehicle to meet such requirement. Therefore, in order that the vehicle is steered clear of an obstruction and keeps on driving in a correct advancing direction after passing by the side of the obstruction, the steering handle had to be turned in the opposite direction already when the vehicle has advanced to the position at the side of the obstruction. Thus, the driver may fail to correctly steer the vehicle when the vehicle is running at a high speed and a traffic accident may result.

It is a primary object of the present invention to obviate the defects of the conventional steering apparatus of the kind above described.

The present invention obviates the prior art defects by incorporating a novel phase advancing system in a conventional power steering mechanism so that an output proportional to the angular velocity of rotation of the steering shaft is added to the output of the conventional power steering mechanism for steering the road engaging wheels without any phase lag.

In accordance with the present invention, there is provided a system for advancing the operating phase of a power steering mechanism for vehicles comprising a pump driven by steering means for discharging a fixed quantity of hydraulic fluid as said steering means is successively rotated from an angular position of rotation to another through a predetermined angle, a first control valve connected to said pump by conduit means, said control valve including therein a valve element movable relative to the valve body, means defining within said valve body a pair of spaced chambers communicating with each other through orifice means, and spring means engaging said valve element for normally maintaining same in its neutral position so that the balance between the force of said spring means and the differential pressure produced across said two chambers due to the hydraulic fluid supplied from said pump is utilized to derive an output proportional to the angular velocity of rotation of said steering means, a second control valve including therein a valve element driven by said steering means and movable relative to the valve body so as to derive an output proportional to the angular position of rotation of said steering means, and means for applying simultaneously said two outputs to an actuator operatively connected to wheel steering means for steering the road engaging wheels.

In the present invention, the two control valves are adapted to individually respond to the angular velocity of rotation of the steering means and the angular position of rotation of the steering means respectively. This arrangement is advantageous in that the two control valves need not be assembled together to provide a single control valve of undesirably large size, and the small size and light weight of these valves is desirable for installation in a vehicle in which the installation space for hydraulic equipment is especially limited. Further, one of these two control valves may be of the spool type, while the other may be of the rocking vane type or any other type, or both may be of the same type as desired. This provides a required versatility for the system. Moreover, a control valve responsive to the angular velocity of rotation of the steering means may be simply added to an existing power steering system to obtain the system according to the present invention. Thus, the technical merits of the present invention can be exhibited without in any way adversely affecting the performance of and while maintaining the reliability of the existing system.

Other objects, features and advantages of the present invention will be apparent from the following description taken in conjunction with the accompanying drawings.

Before giving detailed description of the present invention, two types of prior art power steering mechanism will be described at first so that the improvements according to the present invention can be more clearly understood.

Figure 1:
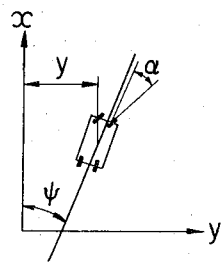
FIG. 1 is a diagrammatic illustration of the relation among the advancing direction, lateral displacement and attitude angle of a vehicle.
Figure 2:
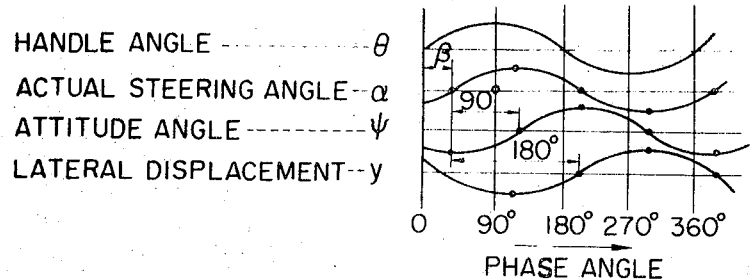
FIG. 2 is a graph illustrating the relation among the handle angle, actual steering angle, attitude angle and lateral displacement.
Figure 3:
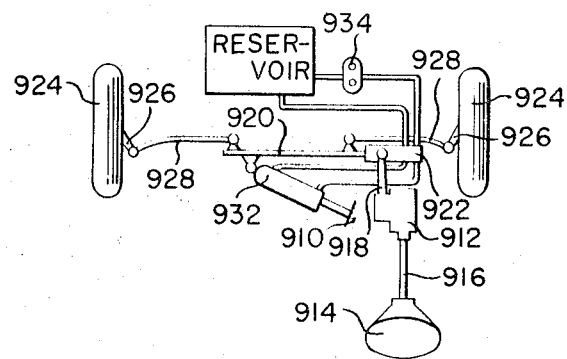
FIG. 3 is a diagrammatic view of a prior art power steering mechanism of the separate type.

Referring to FIG. 3 showing a prior art power steering mechanism of the separate type (In systems of the separate type, the control valve and the actuator are separate from each other.) mounted in a vehicle, a gear box 912 is supported on a portion of the body frame 910 and is connected to a steering shaft 916 carrying a steering wheel 914 at one end thereof. A pitman arm 918 is connected at one end to the output end of the gear box 912 and at the other end to a control valve 922. A relay rod 920 is secured at one end to the housing of the control valve 922 and is connected to tie rods 928. Front wheels 924 are supported on king pins (not shown) and are connected to the tie rods 928 through knuckle arms 926 respectively so that the front wheels 924 are pivotal around the king pins. A pump 934 draws hydraulic fluid from a reservoir and supplies it to an actuator 932 through the control valve 922 by a suitable conduit. The actuator 932 is pivotally connected at one end to a portion of the body frame 910 and at the other end to the relay rod 920 by means of a pin joint.

In operation, manipulation of the steering wheel 914 causes corresponding movement of the pitman arm 918 through the steering shaft 916 and gear box 912. The movement of the pitman arm 918 results in a corresponding shift in the position of the valve spool of the control valve 922 so that fluid under pressure supplied from the pump 934 is passed through the control valve 922 to actuate the actuator 932. The displacement of the actuator 932 is transmitted to the relay rod 920 to steer the front wheels 924.

Figure 4:
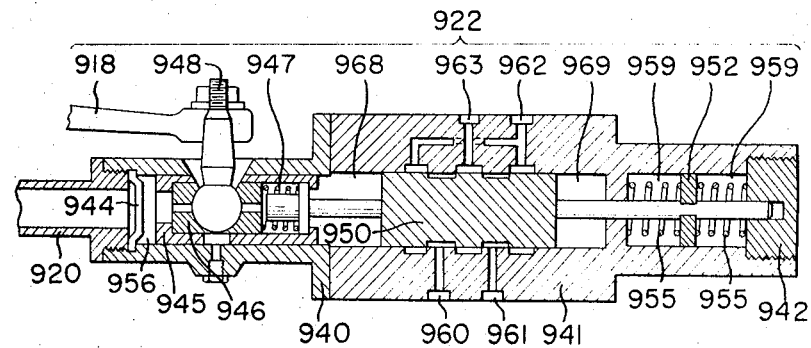
FIG. 4 is an enlarged axial sectional view showing the structure of a control valve shown in FIG. 3.

FIG. 4 shows in detail the structure of the control valve 922 of the spool type in the prior art power steering mechanism of the separate type shown in FIG. 3. In valves of the spool type, the input portion of the valve moves rectilinearly. Referring to FIG. 4, one end of the relay rod 920 is threaded for threaded engagement with one end of an outer housing 940. A valve body 941 is firmly bolted at one end to the other the outer housing 940. A screw plug 942 is screwed into the other end of the valve body 941 and serves as a backing member for one of a pair of springs 955. A dust cover 944 is disposed in the end of the outer housing 940 engaged by the relay rod 920, and the elements 940, 941 and 942 move in unitary relation with the relay rod 920. The pitman arm 918 is connected to a ball stud 948. The ball portion of the ball stud 948 connected to the pitman arm 918 is received within an inner cylinder 945 and is held between a pair of ball seats 946. A spring 947 applies pressure to one of the ball seats 946 so that the ball portion of the ball stud 948 is firmly held between the ball seats 946. A spool shaft 950 having a spool portion is slidable in the axial direction in unitary relation with the pitman arm 918, inner cylinder 945, ball seats 946, spring 947 and ball stud 948. A stopper 952 is fixedly mounted on the spool shaft 950 within a chamber 959 defined in the valve body 941. The springs 955 are disposed in the chamber 959 on opposite sides of the stopper 952 for the purpose of centering the stopper 952, hence the spool shaft 950 relative to the valve body 941. Ports 960 and 961 communicate with the actuator 932, and a port 962 communicates with the pump 934, while a port 963 communicates with the reservoir. A space 956 is defined within the outer housing 940 to allow for sliding movement of the inner cylinder 945 therewithin and is filled with a lubricant such as grease to ensure smooth movement of the inner cylinder 945. Spaces 968 and 969 are provided in the valve body 941 to allow for sliding movement of the spool portion of the spool shaft 950 therewithin.

In operation, the spool shaft 950 is moved relative to the valve body 941 in response to the movement of the pitman arm 918 so as to change over the flow of hydraulic fluid through the control valve 922. Fluid under pressure supplied to the port 962 from the pump 934 is discharged from one of the ports 960 and 961 to be supplied to the actuator 932 depending on the relative displacement of the spool shaft 950 and the valve body 941. In this case, the fluid under pressure returning from the actuator 932 is fed back to the reservoir through the other port 961 or 960 and through the port 963. In the neutral position of the spool shaft 950 relative to the valve body 941, fluid under pressure supplied to the port 962 from the pump 934 returns directly to the reservoir through the port 963 and is not supplied to the ports 960 and 961.

Figure 5:
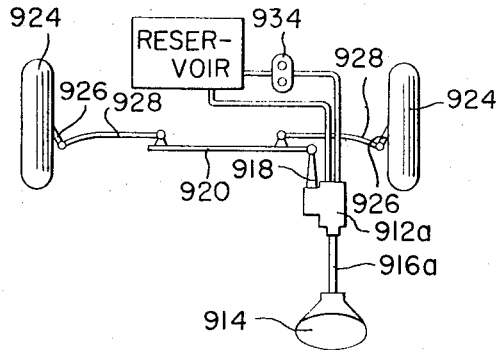
FIG. 5 is a diagrammatic view of a prior art power steering mechanism of the integral type.

Referring to FIG. 5 showing a prior art power steering mechanism of the integral type (In systems of the integral type, the control valve and an actuator are assembled together in a single unit.) mounted in a vehicle, a gear box 912a is supported on a portion of the body frame (not shown) and is connected to a steering shaft 916a carrying a steering wheel 914 at one end thereof. A pitman arm 918 is connected at one end to the output end of the gear box 912a so that torque increased by an actuator in the gear box 912a is transmitted to the pitman arm 918 which is connected at the other end to a relay rod 920. Front wheels 924 are supported on king pins (not shown) and are connected to tie rods 928 through knuckle arms 926 respectively so that the front wheels 924 are pivotal around the king pins. A pump 934 draws hydraulic fluid from a reservoir and supplies it to a control valve in the gear box 912a by a suitable conduit.

In operation, manipulation of the steering wheel 914 causes a corresponding shift in the position of the valve member of the control valve in the gear box 912a through the steering shaft 916a so that fluid under pressure supplied from the pump 934 is passed through the control valve in the gear box 912a to actuate the actuator for the pitman arm 918 for steering the front wheels 924.

Figure 6:
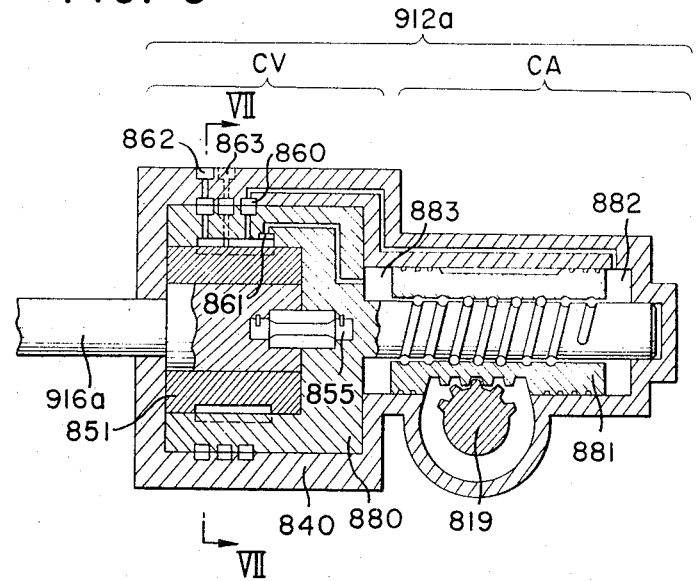
FIG. 6 is an enlarged axial sectional view showing the structure of a control valve shown in FIG. 5.
Figure 7:
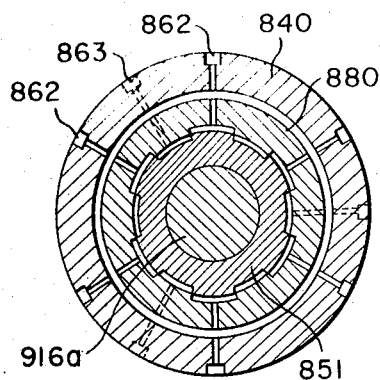
FIG. 7 is a sectional view taken on the line VII — VII in FIG. 6.

FIG. 6 shows in detail the structure of the gear box 912a shown in FIG. 5. Referring to FIG. 6, CV designates the control valve corresponding to the control valve 922 shown in FIGS. 3 and 4. In this case, however, the control valve is in the form of a rotary valve of the rocking vane type in which the input portion of the valve is rocked or rotated. CA designates the actuator corresponding to the actuator 932 shown in FIG. 3. An actuator shaft 880 is threaded adjacent to one end thereof for threaded engagement with a nut 881 and is shaped at the other end portion in the form of a rotary valve housing. The nut 881 which acts as a piston of the actuator CA makes linear movement in its axial direction with the rotation of the actuator shaft 880 so as to cause swinging movement of the pitman arm 918 connected directly to a pinion shaft 819 which meshes with the nut 881. The housing 840 of the gear box 912a is fixed to a portion of the body frame. A rotor 851 is mounted on an enlarged-diameter end portion of the steering shaft 916a and is rotatable within the rotary valve housing to carry out a valve action. A torsion bar 855 is fixed at opposite ends to the end portion of the steering shaft 916a and the rotary valve housing portion of the actuator shaft 880 by means of knock pins for the purpose of centering the end portion of the steering shaft 916a relative to the rotary valve housing portion of the actuator shaft 880. Ports 860 and 861 communicate with respective fluid chambers 882 and 883 of the actuator CA, and ports 862 communicate with the pump 934, while ports 863 communicate with the reservoir.

In operation, the rotor 851 is rotatable relative to the rotary valve housing portion of the actuator shaft 880 so as to change over the flow of hydraulic fluid through the rotary valve CV. Fluid under pressure supplied to the ports 862 from the pump 934 is fed into the fluid chamber 882 of the actuator through the port 860 or into the fluid chamber 883 of the actuator through the port 861 depending on the angular position of the rotor 851 relative to the rotary valve housing portion of the actuator shaft 880. In this case, the fluid under pressure returning from the other chamber 883 or 882 of the actuator is fed back to the reservoir through the other port 861 or 860 and through the ports 863. In the neutral position of the rotor 851 relative to the rotary valve housing portion of the actuator shaft 880, fluid under pressure supplied to the ports 862 from the pump 934 returns directly to the reservoir through the ports 863 and is not supplied to the ports 860 and 861.

Figure 8:
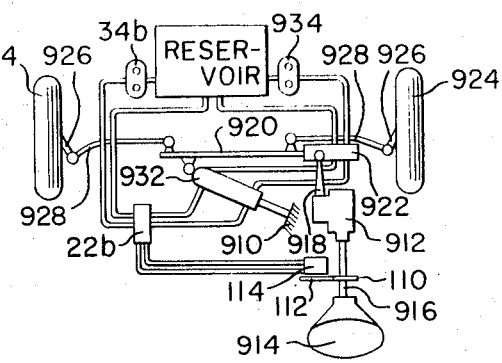
FIG. 8 is a diagrammatic view showing an application of the present invention to a power steering mechanism of the separate type as shown in FIG. 3.

FIG. 8 shows a novel and improved arrangement according to the present invention in which a system of the present invention is incorporated in a prior art power steering mechanism of the type as shown in FIG. 3. In FIG. 8, like reference numerals are used to denote like parts appearing in FIG. 3.

Referring to FIG. 8, a gear box 912 is supported on a portion of the body frame 910 and is connected to a steering shaft 916 carrying a steering wheel 914 at one end thereof. A pitman arm 918 is connected at one end to the output end of the gear box 912 and at the other end to a control valve 922. A relay rod 920 is secured at one end to the housing of the control valve 922 and is connected to tie rods 928. Front wheels 924 are supported on king pins (not shown) and are connected to the tie rods 928 through knuckle arms 926 respectively so that the front wheels 924 are pivotal around the king pins. A pump 934 draws hydraulic fluid from a reservoir and supplies it to an actuator 932 through the control valve 922 by a suitable conduit. The actuator 932 is pivotally connected at one end to a portion of the body frame 910 and at the other end to the relay rod 920 by means of a pin joint. Another pump 114 is driven by the steering shaft 916 through a train of gears 110 and 112 and is connected to a control valve 22b by a suitable conduit. Another pump 34b is also connected to the control valve 22b by a suitable conduit.

In operation, manipulation of the steering wheel 914 causes corresponding movement of the pitman arm 918 through the steering shaft 916 and gear box 912. The movement of the pitman arm 918 results in a corresponding shift in the position of the valve spool of the control valve 922 so that fluid under pressure supplied from the pump 934 is passed through the control valve 922 to be fed to the actuator 932. Further, fluid under pressure supplied from the pump 114 is fed to the control valve 22b to cause a shift in the position of the valve spool in a manner as will be described later so that fluid supplied from the pump 34b is passed through the control valve 22b to be fed to the actuator 932. The displacement of the actuator 932 in response to the fluid under pressure supplied through the control valves 922 and 22b is transmitted to the relay rod 920 for steering the front wheels 924.

Figure 9:
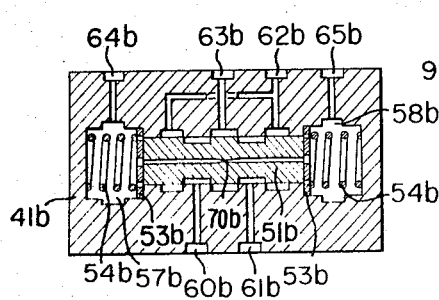
FIG. 9 is an enlarged axial sectional view showing the structure of a control valve shown in FIG. 8.

FIG. 9 shows in detail the structure of the control valve 22b in the system according to the present invention. Referring to FIG. 9, a spool 51b having a central axial fluid passage is movable relative to a valve body 41b and is engaged by washers 53b at opposite ends. Each washer 53b has a central opening communicating with the central fluid passage of the spool 51b as shown. Spaced fluid chambers 57b and 58b are formed in the valve body 41b and receive therein springs 54b of equal resiliency for the purpose of centering the spool 51b relative to the valve body 41b. Ports 60b and 61b communicate with the actuator 932, and a port 62b communicates with the pump 34b. A port 63b communicates with the reservoir, and ports 64b and 65b communicate with the pump 114 and with the respective fluid chambers 57b and 58b. An orifice 70b is provided in the central axial fluid passage formed in the spool 51b so as to produce a differential pressure thereacross.

In operation, the spool 51b is movable relative to the valve body 41b so as to change over the flow of hydraulic fluid through the control valve 22b. Thus, fluid under pressure supplied to the port 62b from the pump 34b is discharged from one of the ports 60b and 61b to be supplied to the actuator 932 depending on the relative displacement of the spool 51b and the valve body 41b. In this case, fluid under pressure returning from the actuator 932 is fed back to the reservoir through the other port 61b or 60b and through the port 63b. In the neutral position of the spool 51b relative to the valve body 41b, fluid under pressure supplied from the pump 34b to the port 62b returns directly to the reservoir through the port 63b and is not supplied to the ports 60b and 61b.

The pump 114 driven by the steering shaft 916 discharges a fixed quantity of fluid under pressure as the steering wheel 914 is successively rotated from an angular position of rotation to another through a predetermined angle. Therefore, the flow rate of fluid discharged from the pump 114 is proportional to the angular velocity of rotation of the steering wheel 914. The orifice 70b produces a differential pressure proportional to the flow rate of the fluid flowing therethrough. Due to the fact that the springs 54b for the centering of the spool 51b relative to the valve body 41b have an equal resilient force, the spool 51b is displaced by an amount corresponding to the differential pressure across the orifice 70b. Thus, the displacement of the spool 51b is proportional to the angular velocity of rotation of the steering wheel 914. When no fluid is discharged from the pump 114, no displacement of the spool 51b occurs due to the centering action of the springs 54b. The arrangement described above provides many advantages. Firstly, the provision of the control valve 22b having such a control function is advantageous in that the input to the actuator 932 is the sum of the input proportional to the angular velocity of rotation of the steering wheel 914 and the input proportional to the angular position of rotation of the steering wheel 914 thereby biasing the relay rod 920 correspondingly to steer the front wheels 924. Secondly, a phase advancing effect can be exhibited as a whole since the displacement proportional to the angular velocity is advanced in phase by 90° relative to the displacement proportional to the angle. Thirdly, the separate privision of the first and second control valves is advantageous in respect of layout. In a power steering system for a vehicle, the installation space for hydraulic equipment is generally quite limited and reduction in the size and weight of the hydraulic equipment is the essential point of design. According to the system of the present invention, the second control valve producing an output proportional to the angular velocity of rotation of the steering wheel can be disposed independently of the first control valve, and these two valves need not be assembled together to provide a single control valve of undesirably large size. Further, the second control valve may be disposed at any suitable position including a portion of the body frame. This is advantageous in that the degree of freedom of design can be increased. In addition to the above, the second control valve may be of a type different from the type of the first control valve in the existing system. Thus, the second control valve may be anyone of the spool type and rocking vane type. This provides a high degree of versatility for this system and lends itself to the standardization of parts, improvements in the reliability and reduction of costs by mass production. Fourthly, the second control valve, pumps, conduits and other required means may be merely added to the existing power steering system to obtain the novel and improved system according to the present invention. Thus, novel and improved performance can be obtained without in any way adversely affecting the performance of the existing system and while retaining the reliability of the system.

Figure 10:
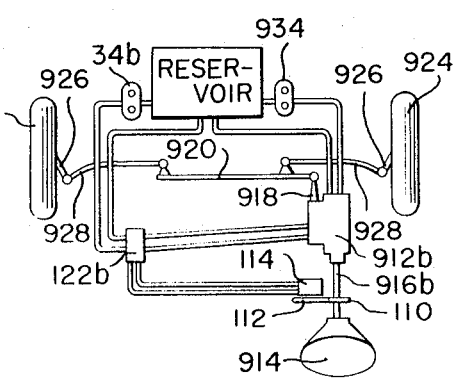
FIG. 10 is a diagrammatic view showing an application of the present invention to a power steering mechanism of the integral type as shown in FIG. 5.

FIG. 10 shows another novel and improved arrangement according to the present invention in which a system of the present invention is incorporated in a prior art power steering mechanism of the integral type as shown in FIG. 5. In FIG. 10, like reference numerals are used to denote like parts appearing in FIG. 5.

Referring to FIG. 10, a gear box 912b is supported on a portion of the body frame (not shown) and is connected to a steering shaft 916b carrying a steering wheel 914 at one end thereof. A pitman arm 918 is connected at one end to the output end of the gear box 912b so that torque increased by an actuator in the gear box 912b is transmitted to the pitman arm 918 which is connected at the other end to a relay rod 920. Front wheels 924 are supported on king pins (not shown) and are connected to tie rods 928 through knuckle arms 926 respectively so that the front wheels 924 are pivotal around the king pins. A pump 934 draws hydraulic fluid from a reservoir and supplies it to a control valve in the gear box 912b by a suitable conduit. Another pump 114 is driven by the steering shaft 916b through a train of gears 110 and 112 and is connected to a control valve 122b by a suitable conduit. Another pump 34b is also connected to the control valve 122b by a suitable conduit.

In operation, manipulation of the steering wheel 914 causes a corresponding shift in the position of the valve member of the control valve in the gear box 912b through the steering shaft 916b so that fluid under pressure supplied from the pump 934 is passed through the control valve in the gear box 912b to be fed to the actuator in the gear box 912b. Fluid under pressure is also supplied from the pump 114 to the control valve 122b to cause a displacement in the position of the valve element of the control valve 122b in a manner as will be described later so that the fluid supplied from the pump 34b is passed through the control valve 122b to be fed to the actuator in the gear box 912b. The actuator is actuated in response to these inputs to bias the pitman arm 918 correspondingly for steering the front wheels 924.

Figure 11:
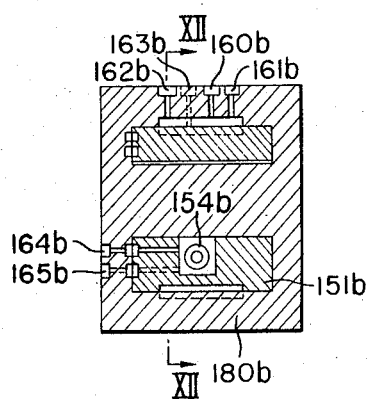
FIG. 11 is an enlarged axial sectional view showing the structure of a control valve shown in FIG. 10.
Figure 12:
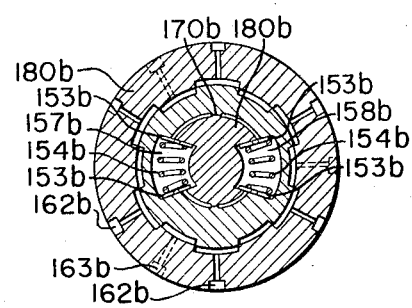
FIG. 12 is a sectional view taken on the line XII — XII in FIG. 11.

FIGS. 11 and 12 show in detail the structure of the control valve 122b in the system according to the present invention. Referring to FIGS. 11 and 12, the control valve 122b includes a rotor 151b rotatable within a rotary valve housing 180b for carrying out a valve action, washers 153b having a central opening, and springs 154b of equal resiliency for centering the rotor 151b relative to the rotary valve housing 180b. Ports 160b and 161b communicate with respective fluid chambers 882 and 883 (FIG. 6) of the actuator in the gear box 912b, and ports 162b communicate with the pump 34b. Ports 163b communicate with the reservoir, and ports 164b and 165b communicate with the pump 114 and with respective fluid chambers 157b and 158b. An orifice 170b is provided between the rotary valve housing 180b and the rotor 151b to produce a differential pressure thereacross.

In operation, the rotor 151b is rotatable relative to the rotary valve housing 180b so as to change over the flow of hydraulic fluid through the control valve 122b. Fluid under pressure supplied to the ports 162b from the pump 34b is fed into the fluid chamber 882 (FIG. 6) of the actuator through the port 160b or into the fluid chamber 883 (FIG. 6) of the actuator through the port 161b depending on the angular position of the rotor 151b relative to the rotary valve housing 180b. In this case, fluid under pressure returning from the other chamber 883 or 882 of the actuator is fed back to the reservoir through the other port 161b or 160b and through the ports 163b. In the neutral position of the rotor 151b relative to the rotary valve housing 180b, fluid under pressure supplied to the ports 162b from the pump 34b returns directly to the reservoir through the ports 163b and is not supplied to the ports 160b and 161b.

The pump 114 driven by the steering shaft 916b discharges a fixed quantity of fluid under pressure as the steering wheel 914 is successively rotated from an angular position of rotation to another through a predetermined angle. Therefore, the flow rate of fluid discharged from the pump 114 is proportional to the angular velocity of rotation of the steering wheel 914. The orifice 170b produces a differential pressure proportional to the flow rate of the fluid flowing therethrough. Due to the fact that the springs 154b for the centering of the rotor 151b relative to the rotary valve housing 180b have an equal resilient force, the rotor 151b is displaced by an amount corresponding to the differential pressure across the orifice 170b. Thus, the displacement in the angular position of the rotor 151b is proportional to the angular velocity of rotation of the steering wheel 914. When no fluid is discharged from the pump 114, no displacement occurs in the angular position of the rotor 151b due to the centering action of the springs 15b.

The arrangement described above provides many advantages. Firstly the provision of the control valve 122b having such a control function is advantageous in that the input to the actuator is the sum of the input proportional to the angular velocity of rotation of the steering wheel 914 and the input proportional to the angular position of rotation of the steering wheel 914 thereby biasing the relay rod 920 correspondingly by the pitman arm 918 to steer the front wheels 924. Secondly, a phase advancing effect can be exhibited as a whole since the displacement proportional to the angular velocity is advanced in phase by 90° relative to the displacement proportional to the angle. Thirdly, the separate provision of the first and second control valves is advantageous in respect of layout. In a power steering system for a vehicle, the installation space for hydraulic equipment is generally quite limited and reduction in the size and weight of the hydraulic equipment is the essential point of design. According to the system of the present invention, the first control valve producing an output proportional to the angular velocity of rotation of the steering wheel can be disposed independently of the second control valve, and these two control valves need not be assembled together to provide a single control valve of undesirably large size. Further, the first control valve may be disposed at any suitable position including a portion of the body frame. This is advantageous in that the degree of freedom of design can be increased. In addition to the above, the first control valve may be of a type different from the type of the second control valve in the existing system. Thus, the first control valve may be anyone of the spool type and swinging vane type. This provides a high degree of versatility for this system and lends itself to the standardization of parts, improvements in the reliability and reduction of costs by mass production. Fourthly, the first control valve, pumps, conduits and other required means may be merely added to the existing power steering system to obtain the novel and improved system according to the present invention. Thus, novel and improved performance can be obtained without in any way adversely affecting the performance of the existing system and while retaining the reliability of the system.

While the control valve 22b shown in FIG. 8 has been shown as a rectilinearly sliding type so that it can be conveniently incorporated in the power steering mechanism of the separate type, this control valve may be replaced by the control valve 122b of the rotary type shown in FIG. 10. Similarly, the control valve 122b of the rotary type incorporated in the power steering mechanism of the integral type shown in FIG. 10 may be replaced by the control valve 22b of the rectilinearly sliding type shown in FIG. 8.

What is claimed is:

1. A system for advancing the operating phase of a power steering mechanism for vehicles comprising a pump driven by steering means for discharging a fixed quantity of hydraulic fluid as said steering means is successively rotated from an angular position of rotation to another through a predetermined angle, a first control valve connected to said by conduit means, means for supplying working fluid under pressure to said first control valve, said first control valve including therein a valve body and a valve element movable relative to the valve body, means defining within said valve body a pair of spaced chambers communicating with each other through orifice means, and spring means engaging said valve element for normally maintaining same in its neutral position so that the balance between the force of said spring means and the differential pressure produced across said two chambers due to the hydraulic fluid supplied from said pump is utilized to derive an output of working fluid from said first control valve proportional to the angular velocity of rotation of said steering means, a second control valve, means for supplying working fluid under pressure to said second control valve, said second control valve having a valve body and a valve element driven by said steering means and movable relative to the valve body so as to derive an output of working fluid proportional to the angular position of rotation of said steering means, and means for applying simultaneously said two outputs of working fluid to an actuator operatively connected to wheel steering means for steering the road engaging wheels.

2. A system as claimed in claim 1 in which the first control valve and the actuator are separate from each other.

3. A system as claimed in claim 1 in which the second control valve and the actuator are assembled together in a single unit.

4. A system as claimed in claim 1 in which the valve element of the first control valve moves rectilinearly.

5. A system according to claim 4 in which the orifice means is provided in the valve element.

6. A system as claimed in claim 4 having a perforated washer in contact with each end of the valve element.

7. A system as claimed in claim 1 in which the input portion of the second control valve is rotated by said steering means.

8. A system for advancing the operating phase of a power steering mechanism for vehicles comprising a pump driven by steering means for the vehicle for discharging a quantity of hydraulic fluid directly proportional to the amount of angular rotation of said steering means, a first control valve connected to said pump by conduit means, means for supplying working fluid under pressure to said first control valve, said first control valve having means for deriving an output of working fluid from said first control valve proportional to the angular velocity of rotation of said steering means, a second control valve, means for supplying working fluid under pressure to said second control valve, said second control valve having means operable by said steering means for deriving an output of working fluid proportional to the angular position of rotation of said steering means, and means for simultaneously supplying said two outputs of working fluid to an actuator operatively connected to wheel steering means for steering the road engaging wheels of the vehicle.

* * * * *

UNITED STATES PATENT OFFICE
CERTIFICATE OF CORRECTION

Patent No. 3,757,886                  Dated September 11, 1973

Inventor(s) Osamu Hirao, Youichi Kimoto and Yoyoshi Sakano

It is certified that error appears in the above-identified patent and that said Letters Patent are hereby corrected as shown below:

Column 3, line 27, change "scrweed" to --screwed--.

Column 6, line 58, change "privision" to --provision--.

Column 9, line 45, (Claim 1, line 7) after "said" insert --pump--.

Signed and sealed this 25th day of December 1973.

(SEAL)
Attest:

EDWARD M. FLETCHER, JR.              RENE D. TEGTMEYER
Attesting Officer                    Acting Commissioner of Patents